No. 739,716. Patented September 22, 1903.

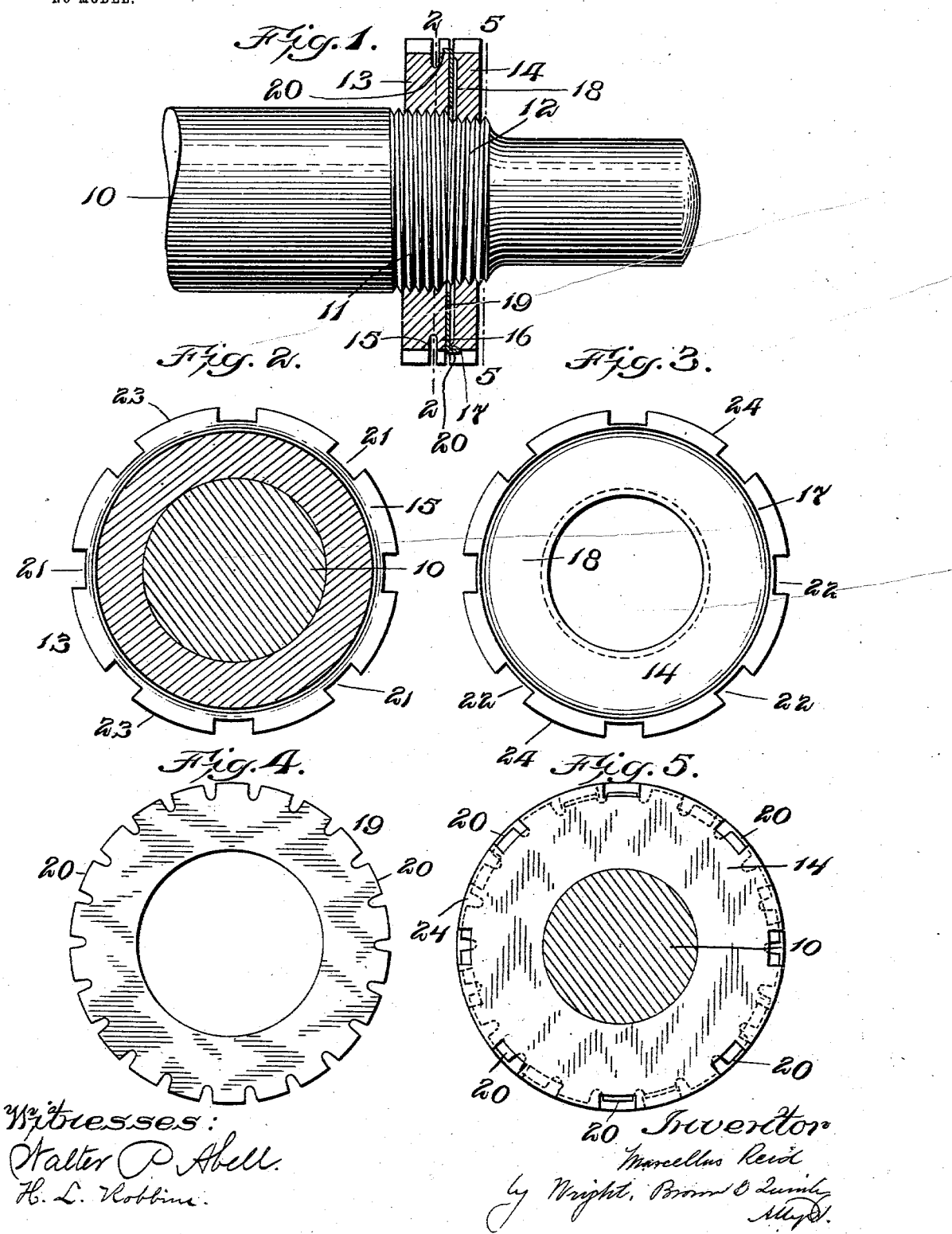

UNITED STATES PATENT OFFICE.

MARCELLUS REID, OF PROVIDENCE, RHODE ISLAND, ASSIGNOR, BY DIRECT AND MESNE ASSIGNMENTS, TO HIMSELF, TRUSTEE.

NUT-LOCK.

SPECIFICATION forming part of Letters Patent No. 739,716, dated September 22, 1903.

Application filed September 6, 1902. Serial No. 122,389. (No model.)

*To all whom it may concern:*

Be it known that I, MARCELLUS REID, of Providence, in the county of Providence and State of Rhode Island, have invented certain new and useful Improvements in Nut-Locks, of which the following is a specification.

This invention relates to nut-locks; and it consists in certain novel features of construction the arrangement of which I will now proceed to describe and claim.

Of the accompanying drawings, Figure 1 represents a longitudinal sectional view of a nut-lock constructed in accordance with my invention. Fig. 2 represents a section on the line 2 2 of Fig. 1. Fig. 3 represents a rear elevation of the outer nut. Fig. 4 represents an elevation of the locking-washer. Fig. 5 represents a section on the line 5 5 of Fig. 1 with the parts in a different relative position from Fig. 1.

The same reference characters represent the same parts in all the figures.

Referring to the drawings, 10 is a shaft, arbor, or support formed with an inner screw-thread 11 and an outer screw-thread 12 of smaller diameter and opposite pitch. Upon the respective threaded portions are mounted inner and outer nuts 13 14, of which the outer nut 14 may be considered a jam-nut, which upon being screwed against the nut 13 locks the latter against movement. The inner nut 13 is formed with an annular circumferential groove 15, which is placed sufficiently near to the outer face of the nut to form a resilient or spring flange 16, forming a radial projection on the nut and adapted to be slightly sprung by the axial pressure of the nut 14. The latter is formed on its inner face with an annular marginal bearing surface or abutment 17, between which and the shaft 10 said inner face of the nut 14 is dished or recessed at 18. The effect of this surface is to afford a bearing or abutment for the nut 14 against the flange portion 16 only of the nut 13, which gives a yielding pressure between the nuts when they are screwed together and increases their frictional locking effect with respect to each other. The nut 14 is made sufficiently thin to be somewhat resilient, and a further effect of the outer annular bearing between the nuts is therefore to slightly dish or concave the outer nut and increase the bite or hold of the outer portions of its thread upon the threaded portion 12 of the shaft 10. This augments the locking action, and the whole structure as thus far described, without the addition of the locking-washer, hereinafter mentioned, affords an efficient nut-lock.

It will be observed that each nut has a portion which is resilient relatively to another portion thereof. For instance, the flange 16 of the nut 13 is resilient relatively to the body of said nut, while the outer marginal bearing-surface 17 of the nut 14 is resilient or adapted to yield relatively to the inner portion of said nut which is adjacent to the shaft or other support 10. The portions of the two nuts which engage each other are therefore resilient in an axial direction, thus permitting the attainment of the advantages above set forth. To attain an additionally secure locking action, however, I interpose between the nuts 13 14 a thin locking-washer 19, made of soft flexible metal, such as mild steel, and formed with a series of flexible lips or teeth 20 20, adapted to be easily bent into or out of the plane of the washer 19. The nuts 13 14 are each formed, as here shown, with a series of eight notches 21 22, extending around their circumferences and located between teeth 23 24, said notches being adapted to receive a spanner for turning the nuts and also constituting recesses into which the flexible lips 20 of the washer 19 may be bent, said lips 20 exactly fitting the notches 21 22. It is evident that by turning certain of the lips 20 of the washer 19 into the notches 21 of the nut 13 and others of said lips into the notches 22 of the nut 14 the washer will become positively interlocked with the two nuts, thus locking said nuts to each other and preventing any outward movement of the nuts upon the shaft 10, for a rotation which tends to screw the nut 13 outwardly along the shaft 10 will on account of the opposite pitch of the threads 11 12 tend to screw the nut 14 in the opposite or inward direction. The teeth or lips 20 of the washer 19 are preferably provided in a considerably larger number than the notches 21 22 in the two nuts, and their number is a non-multiple of the number of the notches. Thus in the illustration there are twenty-two teeth 20 and eight notches 21 or 22, so that there can only be at most two teeth 20 engaged with each nut. If the notches 21 22 of the two nuts are exactly in register, as shown in Fig. 1, there can be only one tooth 20 in engagement with the nut 13 and one in engagement with the nut 14. If, however, the notches of the nuts are out of register, as indicated in Fig. 5, there may be two flexible teeth in engagement with each nut. The arrangement described allows for bringing a pair of notches of either nut into register with a pair of teeth of the washer by a very slight rotation of said nut, for there will always be a pair of teeth at some pair of points in the circle in register, or very nearly so, with a pair of notches of the nut. This slight movement is the more readily permitted (even though the nuts are jammed close together) by reason of the resiliency of the flange 16. The locking-washers 19 are inexpensive and if subjected to long use, so as to bend off their teeth, may be replaced at small cost.

In assembling the device I preferably bend one of the teeth of the washer 20 into one of the notches of nut 13 and then screw up the nut 14. If the notches of the two nuts come into exact register, the other tooth of the pair is bent into an opposite notch on nut 14, as shown in Fig. 1, and if the notches do not come into register the second tooth of the pair is bent into the opposite notch of the nut 13 and a pair of teeth bent into two notches of the nut 14.

I claim—

1. A nut-lock comprising a support formed with screw-threads of opposite pitch, and coacting nuts thereon both of which are resilient in an axial direction at their engaging portions, one of said nuts having a rigid face on the side away from the other nut.

2. A nut-lock comprising a support formed with screw-threads of opposite pitch, and coacting nuts thereon one of which has a rigid body, and a radial marginal resilient flange on the side toward the other nut, said other nut having its body or web resilient in an axial direction, the resilient portions of the nuts engaging each other.

3. A nut-lock comprising a support formed with screw-threads of opposite pitch, nuts thereon relatively resilient in an axial direction at their engaging portions and formed with notched portions, and an interposed locking-washer having flexible locking portions adapted to coact with the notched portions of the respective nuts.

4. A nut-lock comprising a support formed with screw-threads of opposite pitch, nuts thereon formed with notched portions and both having resilient interengaging portions, and an interposed locking-washer having flexible teeth adapted to coact with the notched portions of the respective nuts.

In testimony whereof I have affixed my signature in presence of two witnesses.

MARCELLUS REID.

Witnesses:
C. F. BROWN,
A. D. HARRISON.